US012742971B2

(12) United States Patent
Zou et al.

(10) Patent No.: US 12,742,971 B2
(45) Date of Patent: Sep. 22, 2026

(54) OPTICAL DISPLAY SYSTEM COMPRISING A BEAM SCANNING UNIT AND AN EXIT PUPIL STEERING APPARATUS AND AN ELECTRONIC DEVICE

(71) Applicants: University of Central Florida Research Foundation, Inc., Orlando, FL (US); Goertek Inc., Weifang (CN)

(72) Inventors: Junyu Zou, Orlando, FL (US); Shin-Tson Wu, Oviedo, FL (US); Kun Li, Redwood City, CA (US)

(73) Assignees: University of Central Florida Research Foundation, Inc., Orlando, FL (US); Goertek Inc., Weifang (CN)

( * ) Notice: Subject to any disclaimer, the term of this patent is extended or adjusted under 35 U.S.C. 154(b) by 269 days.

(21) Appl. No.: 18/688,959

(22) PCT Filed: Sep. 2, 2022

(86) PCT No.: PCT/CN2022/116870
§ 371 (c)(1),
(2) Date: Mar. 4, 2024

(87) PCT Pub. No.: WO2023/030505
PCT Pub. Date: Mar. 9, 2023

(65) Prior Publication Data

US 2024/0393596 A1 Nov. 28, 2024

Related U.S. Application Data

(60) Provisional application No. 63/240,465, filed on Sep. 3, 2021.

(51) Int. Cl.
*G02B 27/01* (2006.01)
*G02B 3/12* (2006.01)
(Continued)

(52) U.S. Cl.
CPC ..... *G02B 27/0172* (2013.01); *G02B 27/0179* (2013.01); *G02B 27/286* (2013.01);
(Continued)

(58) Field of Classification Search
CPC ..... G02B 3/12; G02B 5/1823; G02B 27/4261
See application file for complete search history.

(56) References Cited

U.S. PATENT DOCUMENTS

2010/0060551 A1* 3/2010 Sugiyama .............. G02B 26/06 353/31
2016/0238844 A1* 8/2016 Dobschal ............. G02B 5/1842
(Continued)

FOREIGN PATENT DOCUMENTS

CN 109407317 A * 3/2019 ......... G02B 27/0093
CN 110447082 A 11/2019
CN 113196141 A 7/2021

*Primary Examiner* — Paul C Lee
(74) *Attorney, Agent, or Firm* — Baker Botts LLP

(57) ABSTRACT

An optical display system and an electronic device are disclosed. The optical display system comprises: a controllable optical image-generating display apparatus, generating circularly polarized image output; a beam scanning unit, adjusting a direction of the circularly polarized image output; an exit pupil steering apparatus, including diffractive liquid crystal lenses, each of which focuses the circularly polarized image output of one circular polarization state to a distinct focus point and let light with the other circular polarization state pass directly through; and an eye-tracking apparatus, detecting position information of a viewer's eye pupil and providing the position information to the beam scanning unit. The beam scanning unit adjusts the direction of the circularly polarized image output according to the position information, so that the circularly polarized image output is diffracted by one of the diffractive liquid crystal lenses.

13 Claims, 6 Drawing Sheets

(51) Int. Cl.
*G02B 5/18* (2006.01)
*G02B 27/00* (2006.01)
*G02B 27/28* (2006.01)

(52) U.S. Cl.
CPC .............. *G02B 3/12* (2013.01); *G02B 5/1823* (2013.01); *G02B 27/0093* (2013.01); *G02B 2027/0178* (2013.01); *G02B 2027/0187* (2013.01)

(56) References Cited

U.S. PATENT DOCUMENTS

| | | | | |
|---|---|---|---|---|
| 2020/0033693 | A1* | 1/2020 | Lu | G02B 27/0093 |
| 2021/0199970 | A1* | 7/2021 | Huang | G02B 27/0172 |
| 2022/0066202 | A1* | 3/2022 | Gao | G02F 1/0136 |

* cited by examiner

OPTICAL DISPLAY SYSTEM COMPRISING A BEAM SCANNING UNIT AND AN EXIT PUPIL STEERING APPARATUS AND AN ELECTRONIC DEVICE

CROSS-REFERENCE TO RELATED APPLICATIONS

This application is a National Stage of International Application No. PCT/CN2022/116870, filed on Sep. 2, 2022, which claims priority to U.S. Application No. 63/240,465, filed Sep. 3, 2021, both of which are hereby incorporated by reference in their entireties.

TECHNICAL FIELD

The disclosure belongs to the field of optical display system, and more specifically, to an optical display system and an electronic device.

BACKGROUND

In the early years, head-mounted display (HMD) systems encounter great challenge due to the vergence-accommodation conflict (VAC), which makes users or viewers feel dizzy and headache. Retinal projection type (Maxwellian-view) display is a good solution to the VAC issue in HMD.

The conventional Maxwellian-view display consists of a laser projection system and a lens coupler, whose focal point is located at the center of the observer's pupil.

The advantage of this type of display is that it can achieve a very high optical efficiency (100% in theory) while avoiding the VAC issue. However, the optical efficiency and the eyebox size is a trade-off when the active modulator is absent from the display system. Therefore, a major shortcoming of Maxwellian-view displays is the small eyebox size.

There are plenty of works aiming to enlarge the eyebox of Maxwellian-view displays, which can be classified into pupil duplication and pupil steering.

Pupil duplication methods usually apply holographic gratings to split the collimated beams into multiple directions, so that each direction corresponds to one viewing point. This kind of approach is cost effective, but it will introduce some problems. One of the problems is that it is difficult for the users to see clear images because the space gap between the viewing points is either too big or too small. As a result, the users either cannot see any image or will see two partial/ghost images when their eyeballs rotate to some positions. A cause of such problem is that all the viewing points present simultaneously. Another problem is that the direction of the chief ray does not match the user's viewing direction except for the central viewing point. This mismatch will let the user see unnatural image and get a terrible viewing experience at these viewing points. The third drawback of pupil duplication is that the optical efficiency will drop to 1/N, when there are N viewing points present, because only one viewing point is useful at a time.

On the other hand, the pupil steering method can eliminate the first and third disadvantages because there is only one viewing point present at a time. Eye tracking and beam modulation elements are required for the pupil steering system. The beam modulation elements will bring troubles to the lens coupler because the conventional lens coupler can achieve diffraction limits only at one incident angle. Once the input beam is modulated toward various directions, the image quality at some viewing points will drop significantly. Meanwhile, the mismatch between the chief ray and the viewing direction still exists in the pupil steering system.

One solution to correct such a mismatch is to shift the position of lens coupler, but it requires mechanical shifting parts, which will increase the complexity and weight of the system.

SUMMARY

One object of this disclosure is to provide a new technical solution for an optical display system.

According to a first aspect of the present disclosure, there is provided optical display system, comprising: a controllable optical image-generating display apparatus, which generates circularly polarized image output; a beam scanning unit, which adjusts a direction of the circularly polarized image output; an exit pupil steering apparatus, including diffractive liquid crystal lenses, wherein each diffractive liquid crystal lens focuses the circularly polarized image output of one circular polarization state to a distinct focus point and let light with the other circular polarization state pass directly through; and an eye-tracking apparatus, which detects position information of a viewer's eye pupil and provides the position information to the beam scanning unit, wherein the beam scanning unit adjusts the direction of the circularly polarized image output according to the position information, so that the circularly polarized image output is diffracted by one of the diffractive liquid crystal lenses.

According to a second aspect of the present disclosure, there is provided an electronic device, including the optical display system according to an embodiment.

According to an embodiment of this disclosure, a performance of an optical display system can be improved.

Further features of the present disclosure and advantages thereof will become apparent from the following detailed description of exemplary embodiments according to the present disclosure with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

DETAILED DESCRIPTION

Figure 1A:
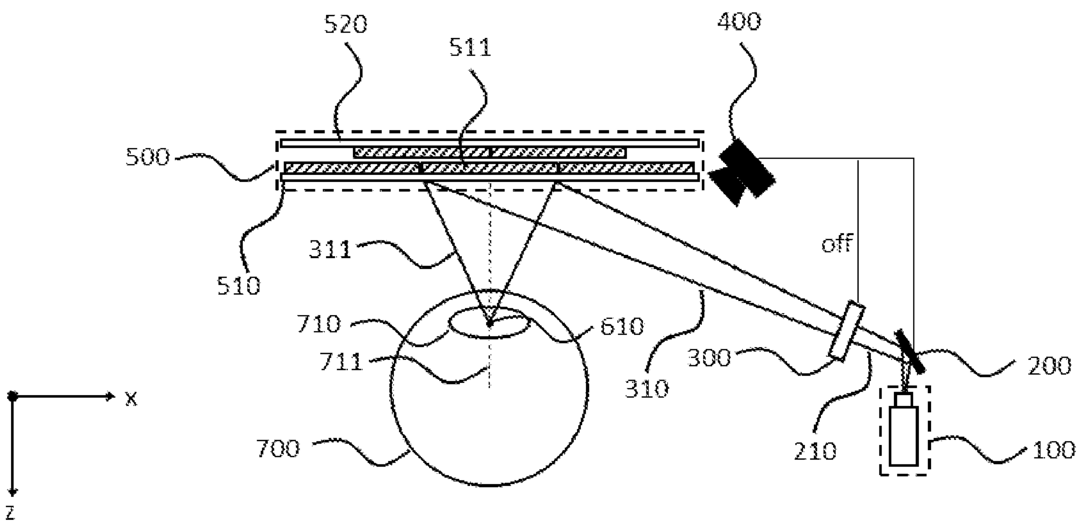
FIGS. 1A to 1E illustrate the working principle of an optical display system according to an exemplary embodiment of the disclosure.

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

In an embodiment of this disclosure, an optical display system is proposed, in which the pupil steering is achieved by customized polarization selective off-axis lens array combined with the polarizing optics. For example, the optical display system is a retinal projection type (Maxwellian-view) display system.

In an embodiment, for example, the optical display system can have an expanded eyebox. In an embodiment, for example, the optical display system can have a good imaging quality. In an embodiment, for example, the optical display system can natural viewing experience. In an embodiment, for example, the optical display system can have high efficiency. In an embodiment, for example, the optical display system can be kept simple, and/or compact, and/or lightweight.

In an embodiment, an optical display system proposed here comprises a controllable optical image-generating display apparatus, a beam scanning unit, an exit pupil steering apparatus, an exit pupil steering apparatus and an eye-tracking apparatus.

The controllable optical image-generating display apparatus generates circularly polarized image output. The circularly polarized image output can be image output or light beam with left handedness circular polarization state or right circular polarization state.

In an embodiment, the controllable optical image-generating display apparatus includes a controllable image-generating component. For example, the controllable image-generating component is configured to output a circularly polarized light. The controllable optical image-generating display apparatus may further include an imaging optical component.

The beam scanning unit adjusts a direction of the circularly polarized image output. In an embodiment, the beam scanning unit can be a micro-electromechanical system (MEMS) device. In an embodiment, the beam scanning unit can be a micro-mirror.

The exit pupil steering apparatus includes diffractive liquid crystal lenses. Each diffractive liquid crystal lens focuses the circularly polarized image output of one circular polarization state to a distinct focus point and let light with the other circular polarization state pass directly through. For example, adjacent diffractive liquid crystal lenses can focus the circularly polarized image output of the same circular polarization state or different circular polarization state.

The eye-tracking apparatus detects position information of a viewer's eye pupil and provides the position information to the beam scanning unit. The beam scanning unit adjusts the direction of the circularly polarized image output according to the position information, so that the circularly polarized image output is diffracted by one of the diffractive liquid crystal lenses. For example, the beam scanning unit is able to adjust the direction of the circularly polarized image output in two dimensions according to the position information of the eye pupil determined by the eye-tracking apparatus.

With the beam scanning unit, the image output can be directed to the desired diffractive liquid crystal lens. The desired diffractive liquid crystal lens diffracts the image output to the position of the viewer's eye pupil.

The eye-tracking apparatus can be those well-known in the prior art and thus will not be described in details here.

In this embodiment, the beam scanning unit, rather than a conventional lens coupler, is used to direct the image output to different diffractive liquid crystal lenses. The issue connected with the lens coupler will at least partially relieved.

In addition, because the beam scanning unit can direct the image output to different diffractive liquid crystal lenses according to the position information and each diffractive liquid crystal lens focuses the image output to a distinct focus point, the optical efficiency and/or image quality of the system can be improved compared with the conventional Maxwellian-view displays.

For example, only one of the diffractive liquid crystal lenses works at a time. That is, only one diffractive liquid crystal lens will receive the image output and direct it to a position and the position corresponds to the viewer's eye pupil detected by the eye-tracking apparatus. As such, the optical efficiency will not be divided. In addition, the diffractive liquid crystal lens is designed for the corresponding position and the image quality will not drop as the conventional Maxwellian-view displays.

In an embodiment, the optical display system further comprises a controllable polarization converter. The controllable polarization converter can change a circular polarization state of the circularly polarized image output between circular polarization states with opposite handedness. For example, the controllable polarization converter can change a circular polarization state of the circularly polarized image output from a circular polarization state with left handedness to a circular polarization state with right handedness, or from a circular polarization state with right handedness to a circular polarization state with left handedness.

For example, the controllable polarization converter has two states that can be selected by programing. In state one, the controllable polarization converter preserves the circular polarization state of the circularly polarized image output. In state two, the controllable polarization converter reverts the circular polarization state of the circularly polarized image output. The controllable polarization converter can be controlled by a switch so that it can be switched between the two states.

The eye-tracking apparatus can also provide the position information to the controllable polarization converter. The controllable polarization converter adjusts the circular polarization state of the circularly polarized image output according to the position information, so that the circularly polarized image output is diffracted by one of the diffractive liquid crystal lenses.

In an embodiment, the exit pupil steering apparatus comprises one layer of diffractive liquid crystal lenses. For example, adjacent diffractive liquid crystal lenses in the same layer work for different circular polarization states. As such, the image output directed to one diffractive liquid crystal lens will not be diffracted by the adjacent diffractive liquid crystal lens, and the image quality may be improved.

In another embodiment, the exit pupil steering apparatus comprises two layers of diffractive liquid crystal lenses. This arrangement can accommodate more diffractive liquid crystal lenses, so that it can direct the image output to more positions. This arrangement can expand the eyebox of the system.

In an embodiment, the diffractive liquid crystal lenses of the exit pupil steering apparatus working for the circularly polarized image output with a same circular polarization state are fabricated on a same layer. This will simplify the manufacture.

In an embodiment, the position of the center of the working diffractive liquid crystal lens matches a viewing direction of the viewer. Because the exit pupil steering apparatus has different diffractive liquid crystal lens and each lens can direct the image output to a different position, the position of the center of the lens can be designed independently. As such, the mismatch between the chief ray and the viewing direction may be relieved.

The optical display system disclosed here can have steerable exit pupil or viewing points and can have eye-tracking based on diffractive liquid crystal lenses. As described above, the optical display system may include a controllable optical image-generating display apparatus, a beam scanning unit, an exit pupil steering apparatus, and an eye-tracking apparatus. The optical display system may further include a controllable polarization converter. The exit pupil steering apparatus includes one or two layers of diffractive liquid crystal lenses and each layer works for one type of circularly polarized light. Based on the eye pupil position detected by the eye-tracking apparatus, the polarization converter will be turned on/off according to which lens is going to work. At the same time, the beam scanning unit can modulate or adjust the beam direction of the image output and make it fill or reach the corresponding diffractive liquid crystal lens, so that the light can be steered to the viewer's eye.

In an embodiment, the position of the diffractive liquid crystal lens center matches the viewing direction of the user. Each lens corresponds to a viewing point/direction.

For example, wavefronts of the diffractive liquid crystal lenses can be recorded independently and can be designed to minimize optical aberrations.

In some embodiments, the number of the diffractive liquid crystal lenses can be increased to generate more viewing points. The eye relief and the size of diffractive liquid crystal lenses may be adjusted to produce different field of views. The shape and position arrangement of the diffractive liquid crystal lenses may also be designed into different patterns. Each lens has a distinct focus point. The location of the lens center also matches with the user's viewing direction. The input light may be selectively diffracted by a specific lens. With the pupil position information provided by the eye-tracking apparatus, the controllable polarization converter and the beam scanning unit will adjust the polarization state of the image output or the input beam and its direction, respectively, so that the corresponding lens may be functional to diffract the image output or the input beam. The wavefront of each diffractive liquid crystal lens is recorded independently and may be designed to minimize the optical aberrations.

FIGS. 1A to 1E schematically illustrate an optical display system with exit pupil steering. The optical display system includes an optical image-generation display apparatus 100, a beam scanning unit 200, a polarization control unit 300, an eye-tracking apparatus 400, and an exit pupil steering apparatus 500.

The beam scanning unit 200 can modulate or adjust the beam direction of an image output or image beam from the optical image-generation display apparatus 100 into two dimensions. The polarization control unit 300 is a controllable polarization converter and has the function to convert incident circularly polarized light or image output between two circular polarization states of opposite handedness. This function of the polarization control unit 300 can be turned on or off by the electronic switch.

In FIGS. 1A to 1E, the exit pupil steering apparatus 500 includes two layers of diffractive liquid crystal lenses. However, in another embodiment, the exit pupil steering apparatus 500 can include one layer of diffractive liquid crystal lenses. The diffractive liquid crystal lenses are spin-coated on two glass substrates 510 and 520, respectively. Each layer diffracts one type of circularly polarized light or image output. The exit pupil steering apparatus 500 shown in FIGS. 1A to 1E is the cross-section along the central line. For the central line cross-section, three diffractive liquid crystal lenses 511, 512, 513 are fabricated on the glass substrate 510, and two diffractive liquid crystal lenses 521, 522 are fabricated on the glass substrate 520.

The image output from image-generation display apparatus 100 is reflected by the beam scanning unit 200. The reflected beam or image output will fill or reach one of the diffracted liquid crystal lenses. After being diffracted by the diffracted liquid crystal lens, the beam is converged into a point at the center of the eye pupil.

Figure 1B:
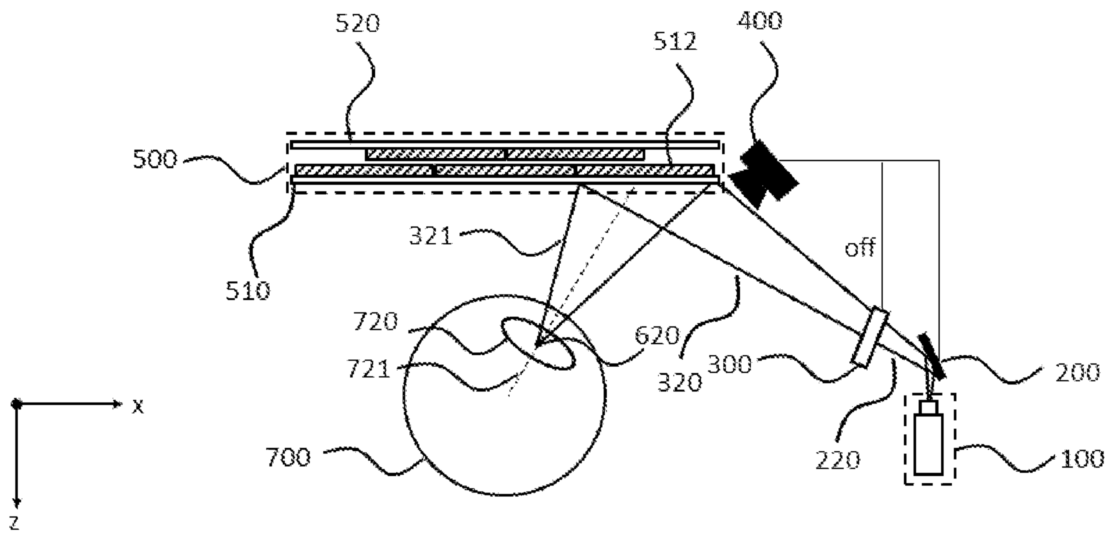

The eye-tracing apparatus 400 tracks the position of eye pupil and delivers the position information to the beam scanning unit 200 and the polarization control unit 300. For example, as shown in FIGS. 1A and 1B, when the viewer's eye 700 is moved and the eye pupil position is changed from 710 to 720, the beam scanning unit 200 changes the beam direction of the image output from 210 to 220. Then, the functional/working diffractive liquid crystal lens is switched from 511 to 512. The converged light changes from 311 to 321, and the focal point shifts from 610 to 620. Since both lenses 511 and 512 work for the same kind of circularly polarized light, the polarization control unit 300 remains off and the light polarization state keeps the same for beams 310 and 320.

Figure 1C:
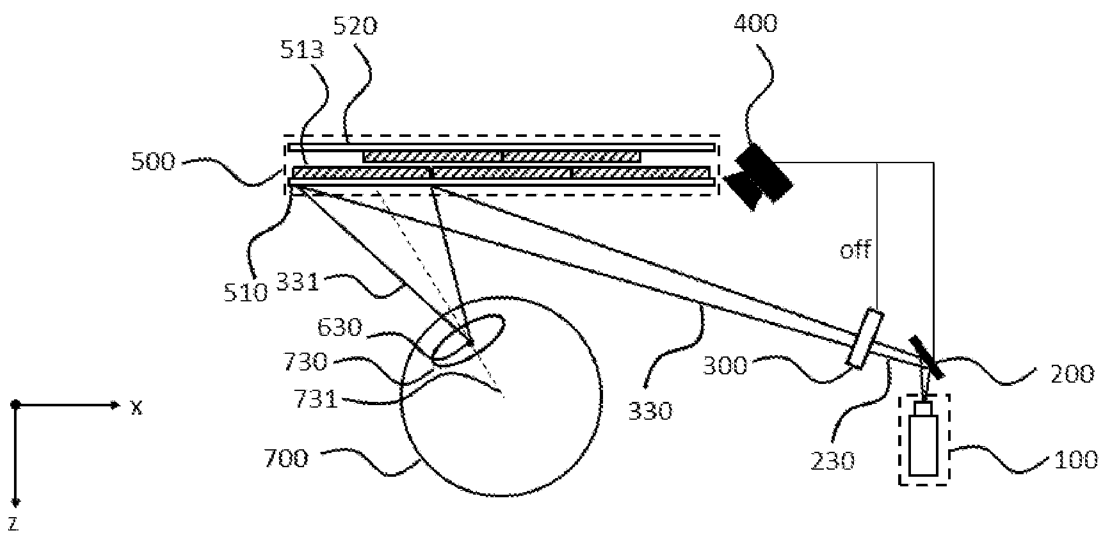

Similarly, FIG. 1C shows the beam direction 230 of the image output directed by the beam scanning unit 200. The polarization control unit 300 changes or keeps the polarization state of the beam if necessary. Then, polarization control unit 300 outputs the beam 330. The beam 330 is incident onto the diffractive liquid crystal lens 513 and is diffracted by the diffractive liquid crystal lens 513 as converged light beam 331 to the focal point 630 of the eye pupil position 730. The center of the diffractive liquid crystal lens 513 corresponds to the viewing direction 731.

Figure 1D:
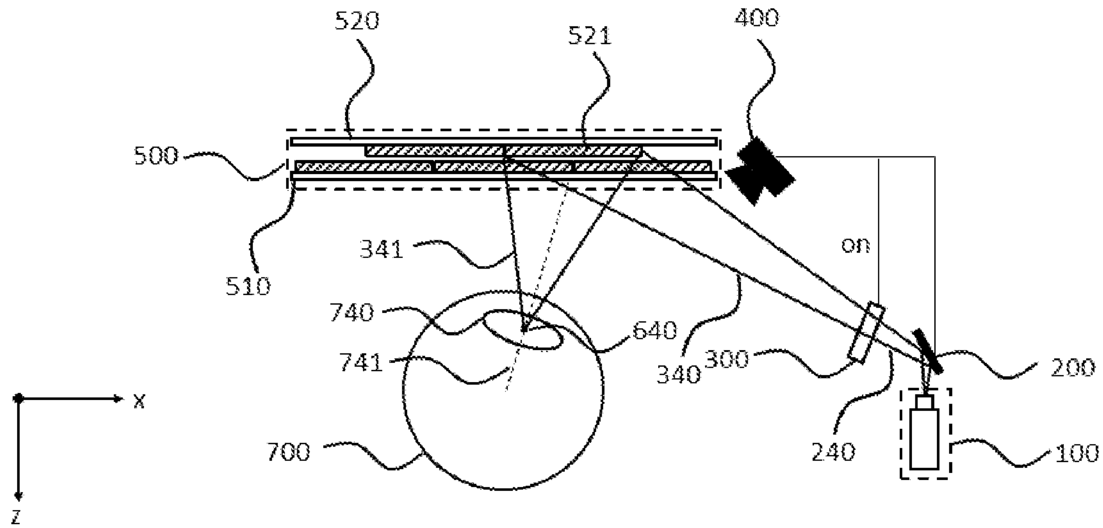

FIG. 1D shows the beam direction 240 of the image output directed by the beam scanning unit 200. The polarization control unit 300 changes or keeps the polarization state of the beam if necessary. Then, polarization control unit 300 outputs the beam 340. The glass substrate 510 does not work on the polarization state of the beam 340 and will let the beam 340 pass directly through. The beam 340 is incident onto the diffractive liquid crystal lens 521 on the glass substrate 520 and is diffracted by the diffractive liquid crystal lens 521 as converged light beam 341 to the focal point 640 of the eye pupil position 740. The center of the diffractive liquid crystal lens 521 corresponds to the viewing direction 741.

Figure 1E:
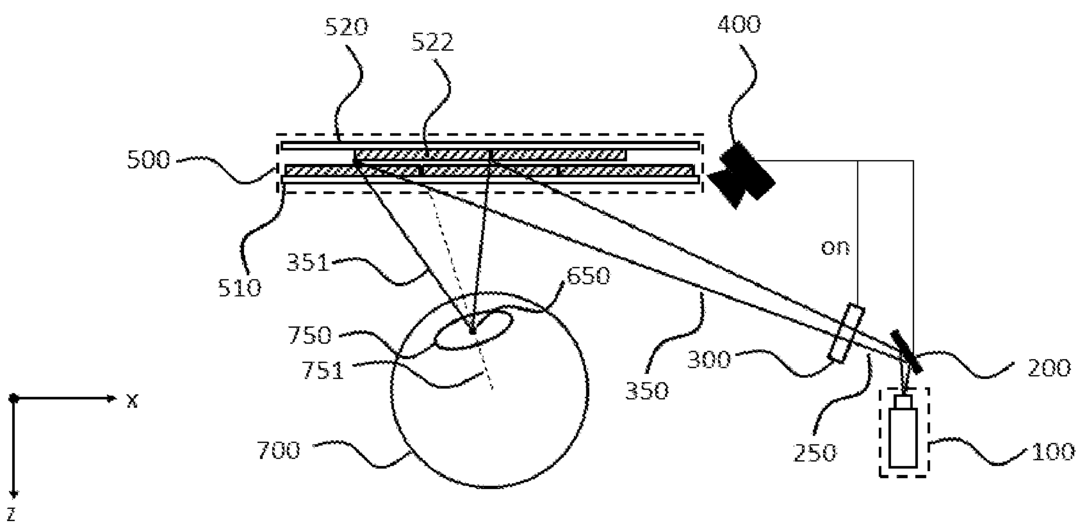

FIG. 1E shows the beam direction 250 of the image output directed by the beam scanning unit 200. The polarization control unit 300 changes or keeps the polarization state of the beam if necessary. Then, polarization control unit 300 outputs the beam 350. The glass substrate 510 does not work on the polarization state of the beam 350 and will let the beam 350 pass directly through. The beam 350 is incident onto the diffractive liquid crystal lens 522 on the glass substrate 520 and is diffracted by the diffractive liquid crystal lens 522 as converged light beam 351 to the focal point 650 of the eye pupil position 750. The center of the diffractive liquid crystal lens 522 corresponds to the viewing direction 751.

Figure 2A:
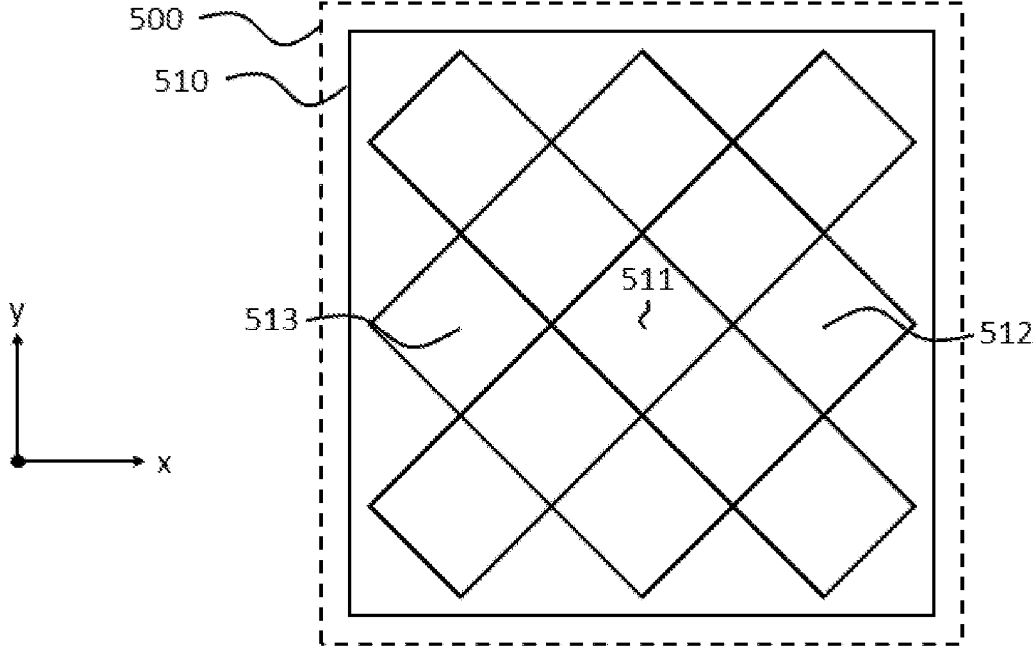
FIGS. 2A and 2B are the sketch for the diffractive liquid crystal lens arrangement of each layer.
Figure 2B:
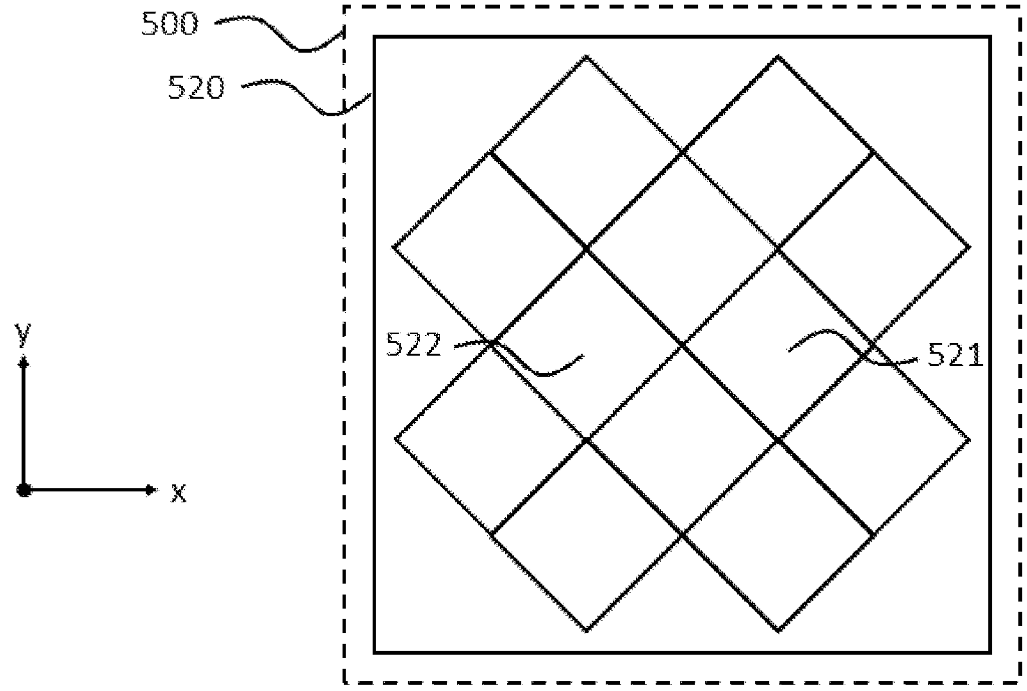
Figure 2C:
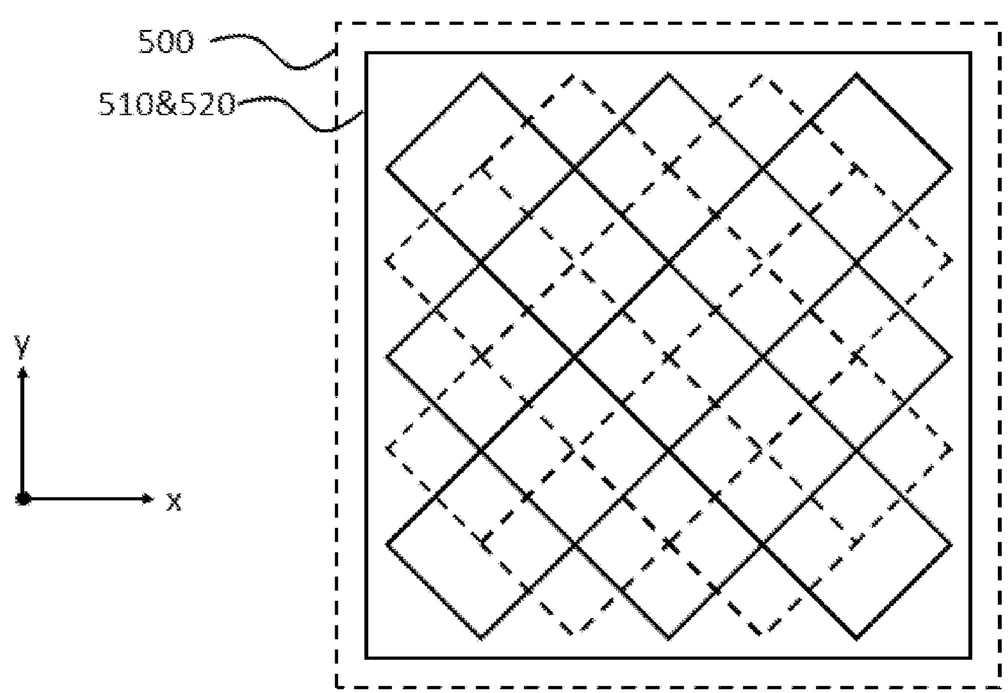
FIG. 2C is a schematic front view of the two layers of diffractive liquid crystal lenses assembled together.

FIGS. 2A to 2C illustrate an example of the diffractive liquid crystal lens arrangement in two dimensions. In the embodiment, two layers 510, 520 of diffractive liquid crystal lenses 511, 512, 513, 521 and 522 are applied in the exit pupil steering apparatus 500. Each layer works for one type of circularly polarized light. The center of each lens corresponds to one of the viewing directions, which are 711, 721, 731, 741 and 751 in FIGS. 1A to 1E, respectively. Therefore, the positions of the lenses can be designed in order to provide reasonable viewing directions. By using one or two layers of diffractive liquid crystal lenses that work for two different circularly polarized lights, the number of viewing directions can be increased.

In some embodiments, when the requirements for the number of viewing directions or the angle of field of view are not high, the exit pupil steering apparatus 500 can have one layer of diffractive lenses. The shape of the lens is square in FIGS. 2A to 2C, but it can be modified to other shapes in some embodiments. The lens size and eye relief can also be modified in some embodiments.

Figure 3:
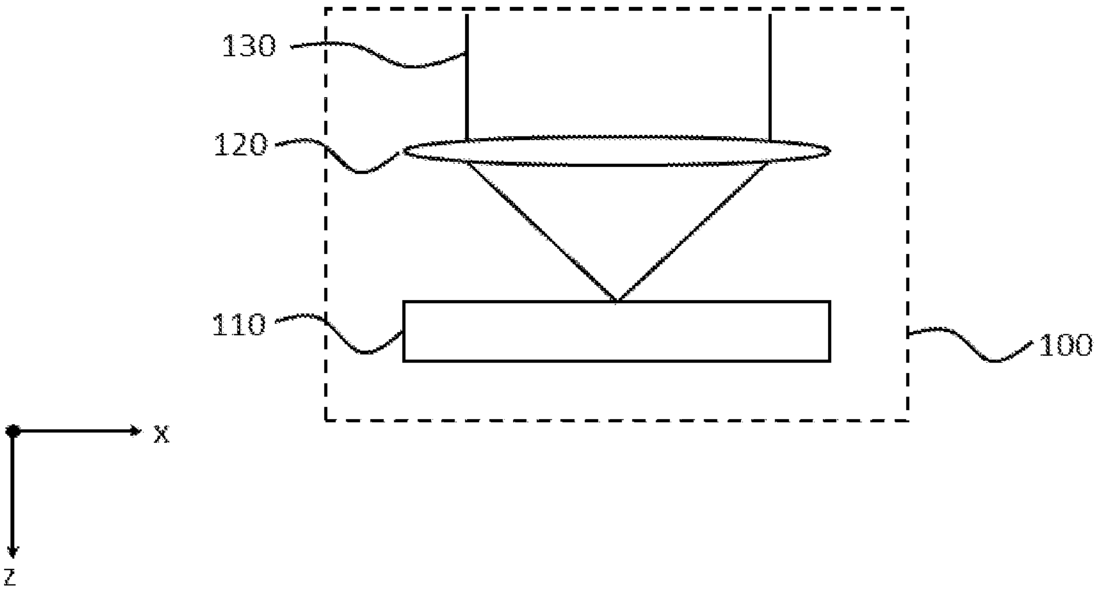
FIG. 3 is a schematic plane view of a controllable optical image-generating display apparatus according to an exemplary embodiment of the disclosure.

In an embodiment, the optical image-generating display apparatus 100 includes a controllable image-generating component 110 and an imaging optical component 120, as shown in FIG. 3. The controllable image-generating component 110 can be a programmable image-generating component. In the embodiments, a laser-scanning display with micro-electromechanical system (MEMS) can be used as image-generating component 110. In some embodiments, the image-generating component 110 can be a liquid-crystal-on-silicon (LCOS) display, an organic light-emitting diode (OLED) display, a micro light-emitting diode (μLED) display, or other display components known in the art. If the display light is not inherently polarized, as produced by, for example, a micro-LED display or an OLED display, then a circular polarizer should be incorporated to produce circularly polarized light output/image output. The imaging optical component 120 may, in some embodiments, include a plurality of lenses, which can be refractive-type or diffractive-type, and a plurality of reflective surfaces. The position of the image-generating component 110 is not necessary at the focal plane of the imaging optical component 120. The output beam 130 can be converged, diverged, or parallel in some embodiments.

Figure 4:
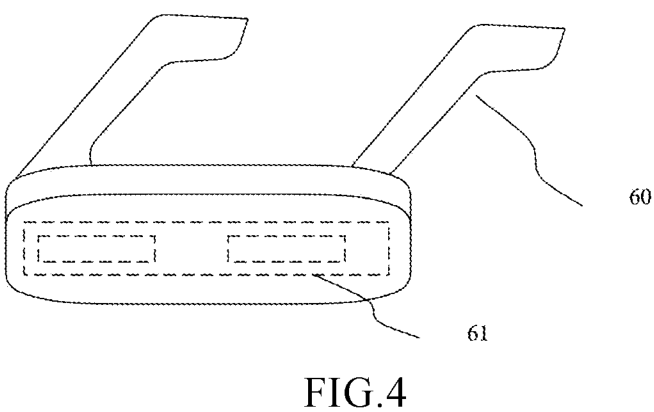
FIG. 4 is a schematic diagram of an electronic device.

FIG. 4 shows an example of an electronic device according to an embodiment. In FIG. 4, the electronic device 60 may be a head-mounted display. The electronic device 60 may include an optical display system 61 as described above.

Although some specific embodiments of the present disclosure have been demonstrated in detail with examples, it should be understood by a person skilled in the art that the above examples and embodiments are only intended to be illustrative but not to limit the scope of the present disclosure.

The invention claimed is:

1. An optical display system, comprising:

a controllable optical image-generating display apparatus, adapted to generate circularly polarized image output;

a beam scanning unit, adapted to reflect the circularly polarized image output to adjust a direction of the circularly polarized image output;

an exit pupil steering apparatus, including a plurality of diffractive liquid crystal lenses, wherein each of the plurality of diffractive liquid crystal lenses is adapted to focus the circularly polarized image output of a first circular polarization state to a distinct focus point and let light with a second circular polarization state pass directly through; and an eye-tracking apparatus, adapted to detect position information of a viewer's eye pupil and provide the position information to the beam scanning unit, wherein the beam scanning unit is adapted to adjust the direction of the circularly polarized image output towards the exit pupil steering apparatus according to the position information, so that the circularly polarized image output is diffracted by one of the diffractive liquid crystal lenses to change the focus point.

2. The optical display system of claim 1, further comprising:

a controllable polarization converter, adapted to change a circular polarization state of the circularly polarized image output between circular polarization states with opposite handedness;

wherein the eye-tracking apparatus provides the position information to the controllable polarization converter, and the controllable polarization converter is adapted to adjust the circular polarization state of the circularly polarized image output according to the position information, so that the circularly polarized image output is diffracted by one of the diffractive liquid crystal lenses.

3. The optical display system of claim 2, wherein the controllable polarization converter has two states that can be selected by programing, wherein in a first state, the controllable polarization converter preserves the circular polarization state of the circularly polarized image output, and in a second state, the controllable polarization converter reverts the circular polarization state of the circularly polarized image output.

4. The optical display system of claim 1, wherein the beam scanning unit is adapted to adjust the direction of the circularly polarized image output in two dimensions according to the position information.

5. The optical display system of claim 1, wherein the exit pupil steering apparatus comprises one layer of diffractive liquid crystal lenses.

6. The optical display system of claim 1, wherein the exit pupil steering apparatus comprises two layers of diffractive liquid crystal lenses.

7. The optical display system of claim 6, wherein the diffractive liquid crystal lenses of the exit pupil steering apparatus working for the circularly polarized image output with a same circular polarization state are fabricated on a same layer.

8. The optical display system of claim 1, wherein only one of the diffractive liquid crystal lenses works at a time, diffracts the circularly polarized image output and directs it to a position corresponding to the viewer's eve pupil detected by the eye-tracking apparatus.

9. The optical display system of claim 8, wherein the position of a center of the working diffractive liquid crystal lenses matches a viewing direction of the viewer.

10. An electronic device including the optical display system of claim 1.

11. The optical display system of claim 2, wherein the exit pupil steering apparatus comprises one layer of diffractive liquid crystal lenses.

12. The optical display system of claim 2, wherein the exit pupil steering apparatus comprises two layers of diffractive liquid crystal lenses.

13. The optical display system of claim 12, wherein the diffractive liquid crystal lenses of the exit pupil steering apparatus working for the circularly polarized image output with a same circular polarization state are fabricated on a same layer.

* * * * *